(No Model.) 5 Sheets—Sheet 1.

J. RAPIEFF.
ELECTRICAL INDICATING APPARATUS FOR LINEAR MEASURE.

No. 441,972. Patented Dec. 2, 1890.

WITNESSES:

INVENTOR
John Rapieff
BY
Chas. W. Forbes
ATTORNEY (No Model.)

J. RAPIEFF.

ELECTRICAL INDICATING APPARATUS FOR LINEAR MEASURE.

No. 441,972. Patented Dec. 2, 1890.

WITNESSES:
H. F. Parker
Aug Greveling

INVENTOR
John Rapieff
BY
Chas. W. Forbes
ATTORNEY (No Model.) 5 Sheets—Sheet 3.

J. RAPIEFF.
ELECTRICAL INDICATING APPARATUS FOR LINEAR MEASURE.

No. 441,972. Patented Dec. 2, 1890.

WITNESSES:

INVENTOR
John Rapieff
BY
Chas. N. Dorlers
ATTORNEY (No Model.) 5 Sheets—Sheet 4.

J. RAPIEFF.
ELECTRICAL INDICATING APPARATUS FOR LINEAR MEASURE.

No. 441,972. Patented Dec. 2, 1890.

WITNESSES:

INVENTOR
John Rapieff
BY
Chas. N. Forbes
ATTORNEY (No Model.) 5 Sheets—Sheet 5.

J. RAPIEFF.
ELECTRICAL INDICATING APPARATUS FOR LINEAR MEASURE.

No. 441,972. Patented Dec. 2, 1890.

WITNESSES:
H. F. Parker
Aug Lindig

INVENTOR
John Rapieff
BY
Chas. W. Forbes
ATTORNEY

UNITED STATES PATENT OFFICE.

JOHN RAPIEFF, OF NEW YORK, N. Y.

ELECTRICAL INDICATING APPARATUS FOR LINEAR MEASURE.

SPECIFICATION forming part of Letters Patent No. 441,972, dated December 2, 1890.

Application filed March 13, 1889. Serial No. 303,140. (No model.)

*To all whom it may concern:*

Be it known that I, JOHN RAPIEFF, a subject of the Czar of Russia, residing in the city, county, and State of New York, have invented certain new and useful Improvements in Electrical Indicating Apparatus for Range-Finders, of which the following is a specification.

My invention is applicable to apparatus used in ordnance practice for the purpose of determining the range or distance of the objective point of firing, and it has particular reference to electrical devices and apparatus whereby the indications or readings of the range or distance of the objective point may be obtained with rapidity and precision at any desired and convenient location from the range-finding instrument itself.

Range-finding instruments are usually constructed on the well-known principle of triangulation. The space between the two telescopes, alidades, or other like instruments constitutes the base of the triangle, and the lines of vision or the axes of these instruments when both are brought to bear on the sighted object whose range or distance is desired constitute the sides of the triangle, the object itself at which the lines of vision converge being the apex of the triangle. The range is calculated with reference to the dimensions of the base-line or the magnitude of the angles, the particular method of calculation depending on which of these factors remain constant and which of them are varied in effecting the measurements. In all cases, however, owing to the reduced length of base-line in comparison with the distance to be calculated, the indications obtained by direct measurement of the relative displacement of the two telescopes or moving parts of the instrument are generally found to exhibit comparatively small differences for large variations of distance, and for this reason it is difficult to read the measurements quickly and with accuracy from the scale of the instrument itself.

In an application for a patent, Serial No. 294,397, filed by me December 22, 1888, describing a new form of range-finding instrument, I have described some mechanical devices whereby the relative displacement of the observing-instruments may be multiplied and increased by gearing and the like, while at the same time the indications are rendered more easily observable, such as by the use of dials, mechanical counters, and the like.

In the present invention I employ electrical means to secure the same objects and to enable me to magnify the relative displacement of moving parts of a range-finding instrument to any extent desirable, and to enable me, further, to convey and transmit such indications to various points at any desired distance while magnifying them for the purpose of making them more precise.

In carrying out my invention I combine two circuits or else two branches of one circuit in such a manner that one of the circuits or branch of circuits will antagonize the action of the other circuit or branch of a circuit in their action upon an indicating device such as hereinafter described. In this way the resultant effect produced on the indicating device is always a "differential" one, or one in which only the difference between the electro-magnetic effects due to the two circuits or branches of circuits is apparent, so that it is only necessary to balance the effects of the two by varying the resistance in one or both in order to neutralize completely their influence on the said indicating device. Thus, if the same indicating device takes the form of a galvanometer, the needle of said galvanometer will be entirely unaffected by the current passing in the two circuits or branches of circuit, and will by its return to its normal or zero position indicate the fact that the said circuits or branches of circuit are balanced against each other. Again, if the indicating device consists of an induction-coil with a telephonic receiver, the balancing of the two circuits will cause the sounds due to circuit interruptions to subside entirely in the telephone. The indicating devices used are intended to operate according to the "zero method," so called, and their function is merely to announce or indicate the point at which the two circuits or branches of circuit become equalized and equilibrated. If the resistance in one of the circuits or branches of circuits is varied, so as to produce a disturbance of the equality or equilibrium, then a variation must be effected in the other circuit or branch of circuit in order to compensate for it and to make the two equal to each other in their effects. In practice I contrive so that the motion of displacement of the parts of the range-finding instrument shall cause a disturbance or variation of resistance in one or both of the branches or circuits, and I adopt a compensating device at another part of the system whereby resistance may be added or subtracted and the equilibrium restored until the coils are again balanced against each other. In this way the compensating resistance employed may become a measure of the displacement of the movable part of the instrument, and consequently a measure of the distance or range of the objective point. Since the relative motion of the parts can be made to cause the resistance to vary at any desired rate whatever, it is apparent that the movement can be in this way magnified, so to speak, to any desired extent.

Having explained the nature of my invention, I will now describe more specifically the devices necessary to put the same in practice, making reference to the accompanying drawings, which form a part of this specification, and in which—

Figure 1:
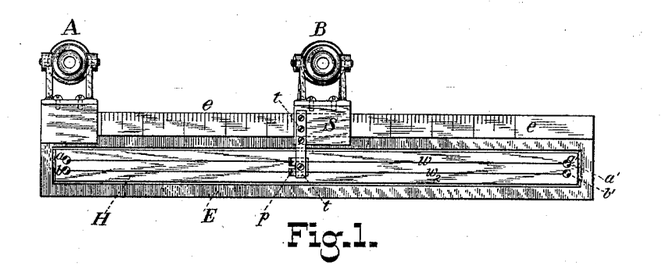
Figure 1 is a side view, and Fig. 2 an end view, of one form of range-finding instrument, showing attachments necessary to apply my invention to such instrument.
Figure 2:
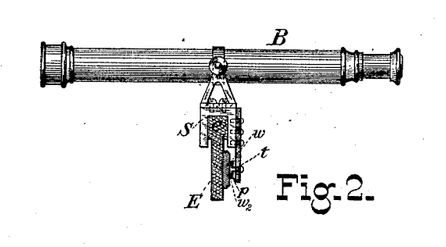

The range-finding instrument shown in Figs. 1 and 2 is of the type I have described in my application for patent above referred to. In this instrument the angles are all fixed and constant. The adjustment is effected by varying the length of the base-line—that is to say, the distance between the two alidades, telescopes, or other instruments of observation. Thus, in Fig. 1, A represents a telescope, which is rigidly mounted on the base-piece E and disposed so that its axis or line of vision is, preferably, at right angles to the base. The second telescope B is mounted upon a saddle S, which slides over the base E, the distance between the two telescopes A B being indicated on a scale $e$. The telescope B is not parallel with the telescope A; but its line of vision is disposed at a certain definite angle with that of telescope A. The telescope B is moved by sliding the saddle S until the object whose range or distance is to be determined is seen in both telescopes, whereupon the distance between the two telescopes furnishes a means of calculating the range according to well-known trigonometrical methods.

I will now describe the attachments by which I am enabled to gage the distance between the two telescopes without the scale and at any place remote from the instrument.

On the side of the base-piece E and parallel with the scale $e$ are two straight resistance-wires $w\ w^2$, extending from one end to the other. These wires, preferably made of German silver or other metal having a high specific resistance, are bare throughout their entire length and are partly embedded in grooves in a plate or strip H, of wood, slate, or other insulating substance. These wires $w\ w^2$ are further secured in their places by being stretched between binding-posts $a\ a'$ and $b\ b'$, respectively, which binding-posts serve for the purpose of making circuit-connections with the other devices used in my invention and hereinafter described.

To the slide of the movable telescope B is secured a small strip $t$, which projects downward, as shown. The small sliding spring $p$ is fastened to and carried by the strip $t$. This small spring, made of elastic metal, is bent inward, partly split in two, as more clearly shown in Fig. 12, so as to make two fingers, and one of the two bent fingers rests on each of the wires $w\ w^2$, as shown. This spring $p$ serves, as will be readily understood, to establish metallic electrical contact between the two parallel contiguous wires $w$ $w$, and when the telescope B is moved by sliding the saddle S on the base-piece E the point of contact between the two wires is shifted an equal distance. It will now appear evident, therefore, that if the two wires are connected at one end to a circuit—as, for instance, at the binding-posts $a\ b$—the motion of the telescope will cause the portions of wire remaining in circuit to vary. Thus if the saddle S is moved toward the left, so as to bring telescope B nearer to telescope A, the portions of wire left included in the circuit will be reduced. A contrary motion would gradually increase the portions of both wires that are included in the circuit. If, on the other hand, the circuit-connections were made at $a'\ b'$ instead of at $a\ b$, the effects of the two motions would be exactly reversed, as will be readily understood.

Figure 3:
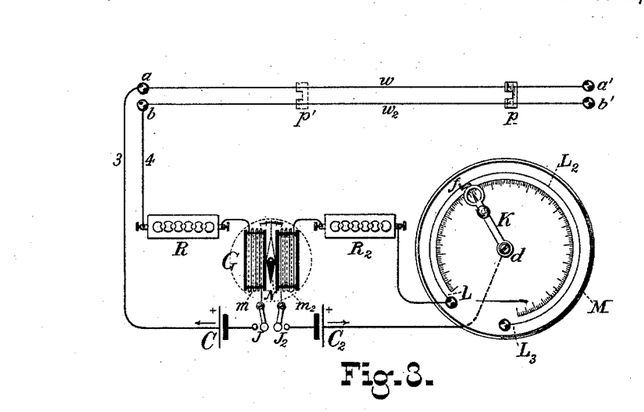
Fig. 3 shows the devices and arrangement of circuits in one method of practicing my invention.

In the arrangement of devices and of circuit-connections shown in Fig. 3, which can be used in practicing my invention, the two parallel wires $w\ w^2$ and the sliding contact-spring $p$ are shown separately from the range-finding instrument for the sake of simplicity and clearness. These two wires are shown connected at $a\ b$, so as to form a part of a circuit which includes a battery C, switch J, one side or coil $m$ of a differential galvanometer G, and a rheostat R. The other coil $m^2$ of the differential galvanometer G forms part of a second circuit, which likewise includes a rheostat $R^2$, battery $C^2$, switch $J^2$, and in addition a variable resistance $L\ L^2\ L^3$.

The differential galvanometer G, batteries $C\ C^2$, switches $J\ J^2$, and rheostats $R\ R^2$ may be of various well-known forms not necessary to describe in detail.

It is to be understood that the differential galvanometer must be connected as usual, so that the two coils may tend to oppose and neutralize each other in their magnetic action on the needle N. The variable resistance may be of various forms. That which is shown in the drawings consists of a bare wire similar to the wires $w\ w^2$ and arranged in the form of a circle on a base M, of wood, slate, or other insulating material, the center of the circle $d$ forming the pivot or axis of a metallic arm K, whose outer end is provided with a spring metal finger $f$, that rests upon the wire and maintains electrical contact with the same while the arm K is rotated around from one end of the wire $L\ L^2\ L^3$ to the other. The circuit-connections are made at $d$ and L, as shown, and in consequence it will be readily understood that when the spring $f$ touches the resistance-wire at L the circuit includes none of the resistance-wire itself, but that, on sliding the contact $f$ around, the wire will gradually be made to form a part of the circuit until the point $L^3$ is reached, where its whole resistance becomes included in the circuit. The circle is graduated or separated into divisions on a circular scale, as shown, and the rotating arm K is provided with a pointer, whereby the positions at which it is stopped can be more easily read off. Where more minute accuracy is required, a vernier can be adapted to the arm K in the well-known manner. In practice the different parts of the electrical apparatus would be grouped together so as to be conveniently reached and manipulated by the observer, and it is clear that this can be done at any distance from the range-finding instrument itself, since the conductors 3 4, connecting the resistance-wires $w\ w^2$, may be of any desired length.

To adjust the apparatus the movable telescope is moved until it is as near as possible to the fixed telescope, so as to bring the contact-spring $p$ at this end of its course, which I represent at $p'$ in Fig. 3.

The two circuits are now closed by the switches $J\ J^2$, and the arm K having been moved back to the zero-point L, the resistance in either or both the circuits is to be adjusted by means of the rheostats R and $R^2$ until the needle of the galvanometer G points at zero, thereby indicating that the two coils $m$ and $m^2$ are receiving such currents as make them neutralize each other perfectly. In the operation of the range-finding instrument the contact-spring $p$ will be moved to the right a certain distance, whereby the resistance in the circuit of battery C will be increased a certain definite amount. It will result from this that the current in coil $m$ will be weakened and the needle N of galvanometer G will be deflected by the excess of electro-magnetic power of the coil $m^2$. The arm K is now to be turned so as to gradually introduce resistance into the circuit of battery $C^2$ until the needle has been brought back to zero again. If the coils $m$ and $m^2$ are exactly balanced in their action on the needle N and if the batteries $C\ C^2$ are of equal electro-motive force, which would normally be the case, then it will be found that the resistance introduced into the circuit of battery $C^2$ at L by the motion of K is exactly equal to that which was introduced into the circuit of battery C by the movement of the contact-spring $p$. If the connections of circuit-wires 3 4 had been made at $a'\ b'$, respectively, instead of at $a$ and $b$, then the motion of spring $p$ would have lessened the resistance in the circuit of battery C, as will be readily understood. Consequently the adjustment would have been made with the arm K turned entirely around, so as to leave the total resistance of $L\ L^2\ L^3$ in the circuit of battery $C^2$, and the compensation would have been effected by gradually moving the arm K backward, thereby reducing the resistance until the galvanometer-needle returned to zero. It will be found, as before, that the resistance removed from the circuit at $w\ w^2$ is exactly the same as that removed at $L\ L^2$. Consequently it makes no difference in result whether the circuit-wires are connected at $a$ and $b$ or at $a'$ and $b'$. It is seen that the change of resistance at $p$ is produced by lengthening or shortening two wires at a time, while the change in the resistance at $f$ takes place in only one wire. If the resistance-wire $L\ L^2\ L^3$ is of the same material and of the same area of section as the wires $w\ w^2$, then it is evident that the lineal motion of the contact $f$ will be twice that of contact $p$ in order to represent the same resistance. In this way the motion is magnified so as to be twice as great. It is possible to increase the ratio still further by making the turns or windings of coil $m$ of galvanometer G greater in number than those in coil $m^2$, or by partially shunting the coil $m^2$, which is equivalent to the same thing. The ratio may also be increased by making the battery $C^2$ of higher electro-motive force than that of C.

Figure 4:
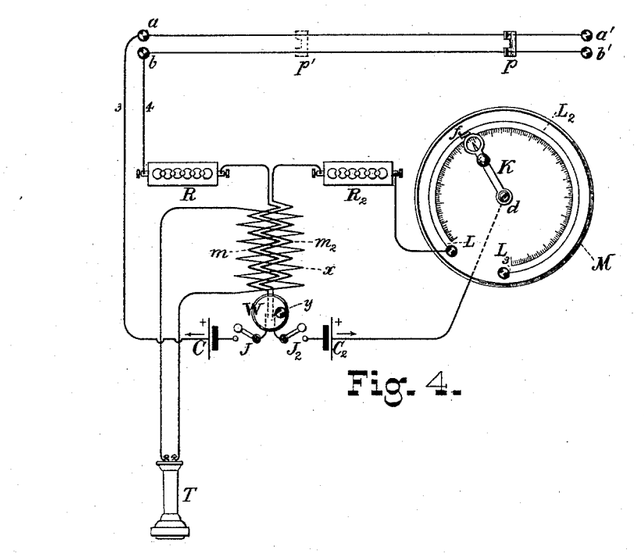
Fig. 4 shows the same with a different apparatus for indicating equilibrium.

The arrangement shown in Fig. 4 is the same as that of Fig. 3, hereinabove described, excepting that the differential galvanometer is replaced by a differential induction-coil. In this case the two coils $m\ m^2$, which are analogous to the coils of like designation in Fig. 3, are wound side by side on the same spool, as indicated diagrammatically, and a secondary coil $x$ is wound over the two, as also indicated diagrammatically. The terminals of the secondary coil are connected to a telephonic receiver T. The coils $m$ and $m^2$ form part of the circuits of battery C and $C^2$, respectively, exactly as in the previously-described arrangement shown in Fig. 3. It is necessary in this case to employ a circuit-interrupter, such as shown at W, arranged to simultaneously interrupt both circuits rapidly. The connections are in this case made as in Fig. 3, so that the electro-magnetic effect of one coil $m$ is counteracted by that of the other $m^2$. Hence since the impulses are simultaneous and of equal duration in both coils, the secondary coil $x$ will only be affected by the difference in the electro-magnetic effects of the two, and the noise heard in the telephone will be louder in proportion as this difference is greater. On the other hand, the more nearly the two coils $m$ and $m^2$ are balanced against each other the smaller will be the differential effect on the coil $x$ and the fainter the sound heard in the telephone until, when a perfect balance between $m$ and $m^2$ is effected, the sounds in the telephone will entirely cease. The cessation of sound is here equivalent to the return of the galvanometer-needle N, Fig. 3, to zero. The apparatus in its operation will therefore give exactly the same results as before, although the telephone is here used instead of a differential galvanometer as the means of finding how much resistance must be added or taken out at $f$ to compensate for the change at $p$.

Referring to both of the preceding arrangements, it will be seen that they could both be modified by connecting the resistance-wires in the second circuit with battery $C^2$ instead of as shown. In such a case the circuit of battery C would when adjusted remain undisturbed. The resistance variations would take place entirely in the circuit of battery $C^2$. It is clear that the balance would be obtained in the same way, because for every given resistance added to or taken from the circuit at $p$ an equal resistance must be added or taken from said circuit at $f$ to produce equilibrium. This modification is also applicable to all the forms hereinafter described.

Figure 5:
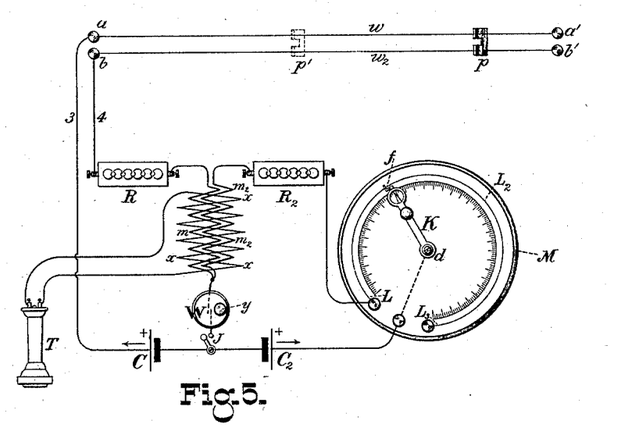
Fig. 5 shows a modified arrangement in which the two circuits are connected together at one point.

The modification introduced in Fig. 5 relates simply to the interrupter W, which is made single. In this case the two circuits are connected together at the switch J, but again separate after passing through the interrupter W. It is evident, of course, that the differential galvanometer could be used instead of the differential induction-coil and telephone.

Figure 6:
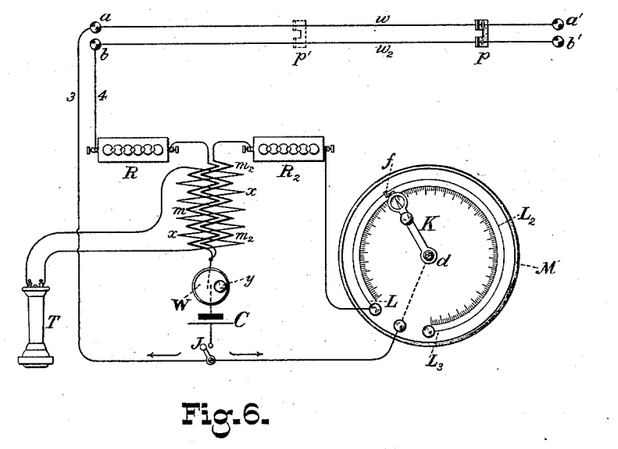
Fig. 6 shows a modified arrangement using only one battery.

Fig. 6 shows a further modification, which is derived from the preceding. In this case there is only one battery instead of two, and the arrangement is that of a divided circuit of two branches. The use of a single battery for the two branches of the circuit has the advantage of obviating all disturbances and errors due to the variations of electro-motive force between two distinct batteries. This arrangement can be used with either a differential galvanometer or induction-coil. Its operation is identical and will give exactly the same results as that of the forms previously described.

Figure 7:
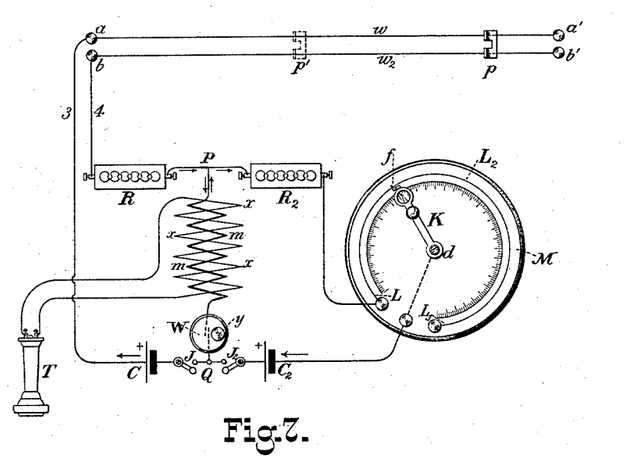
Fig. 7 shows a modified arrangement with a slightly-varied form of indicating device.

Fig. 7 shows another modified arrangement, in which the differential action is produced between the two branches of one circuit by means of two distinct batteries. In this case the two batteries C $C^2$ are connected in such a manner that they assist each other in one part of the circuit, but oppose each other in another part. The latter part is that in which the induction-coil $m$ $x$ is placed. It is evident that since the two batteries oppose each other in this part, as shown by the small arrows, the current passing will be equal to the difference between the two sides, and that when both sides are made equal, so that the potentials of batteries C $C^2$ shall have equal differences at P Q, as by compensating resistances, there will no longer be any current through this part. Hence it follows that in this case a single coil $m$ will of itself perform the function of a differential coil whether this coil be used as an induction-coil with the interrupter W, as shown in Fig. 7, or whether it be the winding of a single-coil galvanometer. In either case when one side or branch of the circuit overbalances the other there will be current through the coil $m$ in one direction, and vice versa. When both sides are perfectly balanced, there will be no current through the coil $m$. This arrangement is identical with those already described in operation and results.

Figure 8:
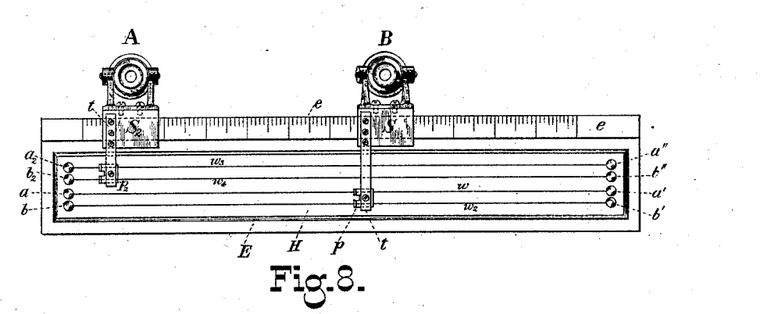
Fig. 8 shows a different form of range-finding instrument with the required modification in the attachments necessary to practice my invention.

Fig. 8 shows another form of range-finding instrument with the modifications necessary in the appliances for adapting my invention to the same. For the sake of simplicity we may consider this instrument to be on the same principle as that shown in Fig. 1, excepting that in this case both of the instruments are movable on saddles S $S^2$. From the consideration of the principle of this form of instrument it will be found that for a given range the absolute distance between the telescopes A and B will always be the same whether one or both be moved in effecting the adjustment. There are other forms of range-finding instruments operating on slightly-different principles from the above, but presenting the same peculiarity that for a given range the two slides or saddles S $S^2$ supporting the telescopes or alidades A B are always at the some absolute distance apart. Hence in this case the measurement is to be effected by finding the distance between the two telescopes or other visual instruments without reference to their respective or relative positions on the slides on which they are mounted. In adapting my invention to instruments operating on this principle I arrange a pair of resistance-wires for each of the two telescopes. Thus the telescope B has its contact $p$ moving over the wires $w$ $w^2$ exactly as in Fig. 1; but in addition the telescope A has its saddle $S^2$ also provided with a contact $p^2$, moving over a similar pair of resistance-wires $w^3$ $w^4$. The two pairs are placed one above the other, as shown, so that either saddle can move the whole length of the base-line for the purpose of effecting the adjustments without interfering with the other. Instead of placing the two pairs of wires one above the other, it is evident on reference to Figs. 1 and 2 that the second pair of wires could be placed on the other side of this support-plate E. There are two ways of connecting these resistance-wires to the devices of my invention.

Figure 9:
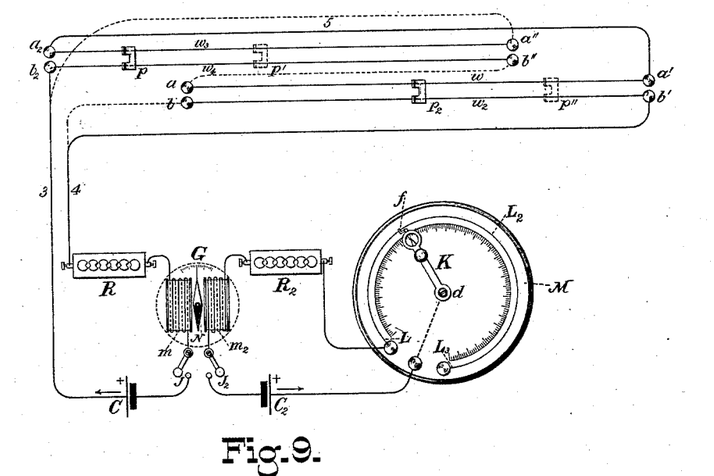
Figs. 9 and 10 show different adaptations of the preceding form of range-finding instrument in practical working.

Fig. 9 shows the same arrangement of these devices as Fig. 3. The circuit-wires 3 4 here connect to the resistance-wires $w^4$ $w^2$ at $b^2$ $b'$, respectively, while the two resistance-wires $w$ $w^3$ are connected together at $a'$ $a^3$ by a wire 5 of low resistance.

Supposing the telescopes to be situated at such points on the base-piece that the wires $w$ $w^2$ are crossed at $p^2$ and the wires $w^3$ $w^4$ at $p$, it will be seen that if both are moved together in either direction, so as to maintain the same absolute distance between them—such as, for instance, at the points $p'$ $p''$—the resistance included in the circuit of battery C will not thereby be varied so as to be changed. This is evident from the fact that while the motion $p$ to $p'$ has added the resistance of two portions of resistance-wires $w^3$ $w^4$ the motion of $p^2$ to $p''$ has taken out two equal portions of resistance-wires $w$ $w^2$. If, however, one of the telescopes had been moved either more or less than the other, a difference would appear in the amount of wire-resistance remaining in the circuit of battery C.

With the connections made as in Fig. 9 it will be found that whenever the relative distance between the two instruments is decreased by moving the one or the other, or both, the resistance in the circuit of battery C is increased and a corresponding amount of resistance must be put into the circuit of battery $C^2$ by manipulating K in order to restore equilibrium. If, instead of these connections, the wires 3 4 were connected at $a''$ $b$, respectively, and the wires $w$ $w^4$ joined at $a$ $b''$, as shown by dotted lines, then these effects would be exactly reversed, and the relative approach of the two instruments would cause the circuit-resistance of battery C to diminish, and their separation would increase it. The apparatus may be adjusted so as to give indications at $f$ in either direction—that is to say, from either the point of maximum or of minimum separation between the two instruments.

Figure 10:
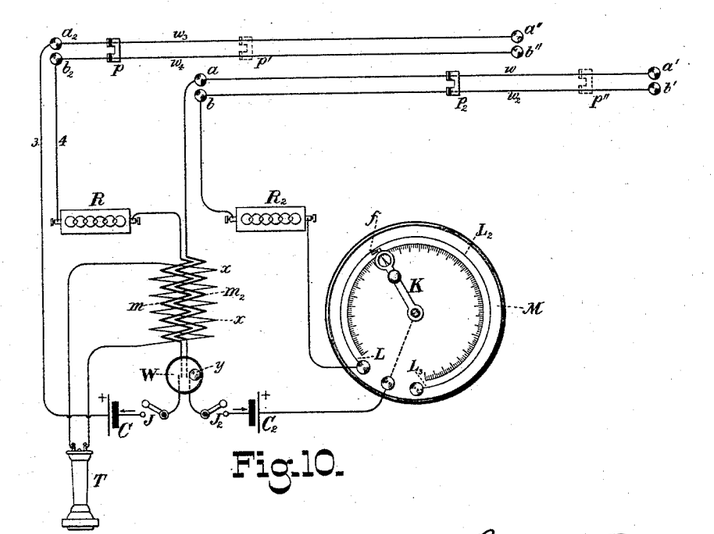

Fig. 10 shows the second mode of making the connections. It is seen that one pair of wires $w$ $w^2$ is included in the circuit of battery C, while the other is included in the circuit of battery $C^2$. As long as the two telescopes remain the same distance apart their movement either way will add the same definite resistance to both branches or remove it, and consequently the balance will not be disturbed; but any movements which cause the separation to increase or diminish will cause an excess of resistance in one or the other of the two circuits. In this case, however, the zero-point or point of adjustment for the compensating resistance L $L^2$ $L^3$ must be made somewhere midway between the two ends, instead of at one end, as in the previous forms. This is precisely because the adjustment of telescopes may here produce a variation in both circuits, and the resultant effect may be such as to either increase or decrease the resistance in the circuit of battery $C^2$. If, for instance, the adjustment were effected by moving $p$ to $p'$ and leaving $p^2$ stationary, then clearly the resistance would be increased in the circuit of battery C and the contact $f$ would require to be moved forward toward $L^3$, so as to increase the resistance equally in the other circuit. If, however, the adjustment were effected by leaving $p$ stationary and moving $p^2$ to $p''$, then the circuit of battery C would remain unaffected; but the resistance of the circuit of battery $C^2$ would be increased by a certain amount, to compensate for which the contact-arm $f$ would require to be moved backward, so as to cut out an equal amount of resistance.

Both of the hereinabove arrangements shown in Figs. 9 and 10 are applicable to the modifications already described, and shown in Figs. 3, 4, 5, 6, and 7.

It will be well understood by those skilled in the art that the amount of resistance variation effected by a given movement of the sliding contact $p$ in any of the forms hereinabove described can be regulated within very wide limits by a simple change in the diameter of the wires or by using metal of different specific resistance.

In ordinary practice I prefer to employ such metals or alloys as possess a comparatively high specific resistance, and I also make the diameter as small as the considerations of mechanical endurance and proper practical working will admit. In this way I make the resistance variation as large as possible per unit of movement of the contact-spring.

Figure 11:
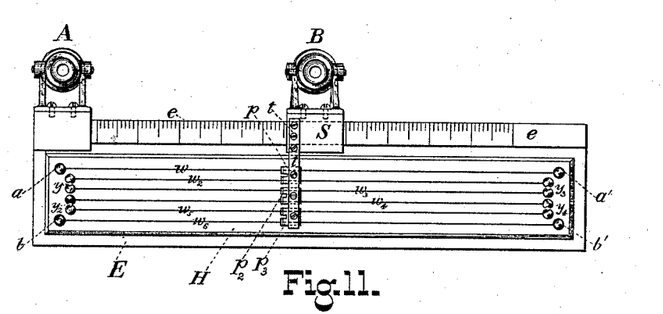
Fig. 11 shows a general modification applicable to various forms of range-finding or other instruments.

In some cases it is desirable to increase still further the rate of variation of resistance, and for this purpose I modify the arrangement in the manner indicated in Fig. 11, so as to multiply the length of wire that is acted upon by the motion of the slide S, carrying the telescope B or other visual instrument. The wires $w$ and $w^6$ (which correspond precisely to the wires $w$ $w^2$ of Fig. 1 and are, like them, connected to binding-posts $a$ $a'$ and $b$ $b'$) are here placed farther apart, so as to leave space for two more pairs of like wires $w^2$ $w^3$ and $w^4$ $w^5$, which are stretched in grooves parallel with the wires $w$ $w^6$. These wires are connected at each end to terminals such as used on rheostats for making connections with a plug. If now the connections with the electrical apparatus are made at $a$ $b$ by means of the conductors 3 4, Fig. 3, then a plug-connection is to be also made at $y$ and $y^2$. It is seen that the carrier $t$ has three sliding contact-springs $p\ p^2\ p^3$ instead of only one. Consequently when the connections are made as just stated there will be three pairs of resistance-wires introduced into the circuit instead of one, as in Fig. 1. A movement of the slides S to the right will cause a simultaneous increase of resistance in all three pairs of wires, while a movement to the left will cause a decrease. If instead the circuit-conductors were to be connected at $a''$ $b'$, then the plug-connections would be made at $y^3\ y^4$, and these results would be exactly reversed, as will be readily understood. It is evident that the number of such pairs of additional resistance-wires can be increased to any desired limit by making the supporting-plate H of sufficient width. In cases where the working principle of the range-finding apparatus involves the motion of both the visual instruments A and B, as in Fig. 8, I prefer to utilize both sides of the frame E, and in such a case both faces of said frame would be provided with an equal number of pairs of wires arranged as in Fig. 11. The contacts $p\ p^2\ p^3$ of one side would be moved by one of the slides S and those on the other side by the other slide $S^2$. The amplification or magnifying of the movement can be further increased in the compensating resistance itself. As already shown, when the wire L $L^2\ L^3$ is of the same material and diameter as the wires $w\ w^2$, Fig. 1, the lineal motion required is twice as great at $f$, Fig. 3, to counterbalance a given lineal motion of the sliding contact $p$; but if the diameter of wire L $L^2\ L^3$ were made larger, or if the metal used were of lower specific resistance, then a much greater lineal motion would be required.

Figure 12:
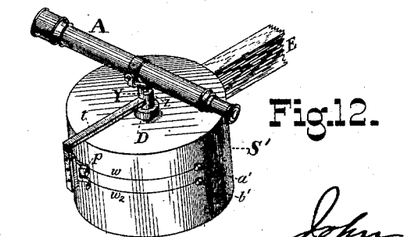
Fig. 12 shows the arrangement of parts when my method is applied to the measurement of angles.

It will be understood by persons skilled in the art that the practical forms and arrangements can be varied greatly and would be influenced by the particular form of range-finding apparatus and the special requirements to be met. Thus in the case of a range-finder having a fixed base-line where the measurements are effected by taking the angle of both visual instruments the arrangement would be varied, as shown in Fig. 12. The wires $w\ w^2$ are in this case stretched on the outside of a cylinder $S'$, so as to be concentric with the axis $z$, on which the telescope or alidade is mounted. The carrier $t$, carrying the contact-spring $p$, here takes the form of a bent arm projecting radially from the telescope-support Y, as shown. The circuit-connections may be made according to any of the methods hereinabove described. In this case the variations of resistance would correspond to angular displacements of the telescope, and the compensating resistances required at L $L^2$, Figs. 3, 4, &c., to produce equilibrium would become the measure of the angle whose value is to be obtained. It is evident that the number of wires can be increased by disposing them in the same manner as in Fig. 11.

In Fig. 10 the wires 3 4 may be connected, as at $a''\ b''$, to form a circuit of unvariable or constant resistance through the battery C (the contact $p$ being omitted) in application to an apparatus in which the position of one movable telescope or body is to be ascertained. The circuit of battery C thereby becomes a standard quantity with which the circuit of battery $C^2$, including both the variable resistance controlled by the movable body and the compensating resistance controlled by the lineal-measure indicator, is compared and measured.

I am aware that differential actions, as exhibited between two distinct circuits or branches of circuit or between two distinct batteries, have been used by electricians in making measurements, and I do not wish to claim these as of my discovery or invention. Neither do I claim the improvement in the art of finding the range of a distant object, which consists in first determining a fractional portion of a conducting body bearing in length a ratio to the angle included between two lines of sight directed upon a distant object, and, second, measuring the electrical resistance of said length, as I am not the first inventor thereof; but

I claim as my invention—

1. The combination, in a range-finding instrument, of two telescopes or alidades having a linear movement with relation to each other, one or both thereof bearing electric contacts, conductors parallel with the path of movement of the telescopes upon which the said contacts act to determine a fractional included portion, and electrical circuits or branches of a circuit, one of which includes said fractional portion, another of which includes a measurable resistance-equalizer, by which lineal measurements are indicated.

2. The combination, in a range-finding instrument, of two telescopes or alidades having a linear movement with relation to each other at fixed angles upon a triangulating base-line, electrical resisting-conductors parallel with the path of movement of said telescope, contacts thereon controlled by the movements of one or both the telescopes, according to the distance apart of the same, an electric circuit or circuits, and a resistance-measuring device, substantially as described.

3. The combination, in a range-finding instrument, of two telescopes or alidades having a linear movement with relation to each other, and electric circuits or branches of a circuit, one of which has invariable resistance, the other a variable resistance controlled by the said movable relation of the telescopes and including a resistance-measuring device, substantially as and for the purposes set forth.

4. The combination, in a range-finding instrument, of two telescopes or alidades having a linear movement with relation to each other, an electric circuit including a variable resisting-conductor controlled by the movable relation of the telescopes and including a compensating resisting-conductor giving lineal-measure indications, batteries in said circuit which assist each other in portions of the circuit, including the said variable and compensating resistance-conductors, a cutting-out branch connecting from a point between the said variable and compensating resistance-conductors to a point between the said batteries and through which the batteries oppose each other, and an electro-magnetic indicating device in the connecting branch, for the purposes set forth.

5. The combination, in a range-finding instrument, of two telescopes or alidades having a linear movement with relation to each other, and electric circuits or branches of a circuit, the one including a variable resisting-conductor controlled by the movement of the first telescope, the other including a variable resisting-conductor controlled by the movement of the second telescope, and also including a compensating resistance-conductor giving lineal-measure indications, for the specified purpose.

6. The combination, in a range-finding instrument, of two telescopes or alidades, both having a linear movement with relation to each other, an electric circuit or branch of a circuit having variable resistance-conductors which the said telescopes respectively control, said resistance-conductors being electrically connected with the circuit, substantially as described, whereby the aggregate amount of resistance will have uniform ratio to the distance apart of the telescopes, and a compensating resistance-conductor giving lineal-measure indications, as specified.

7. The combination, with the telescopes or alidades of a range-finding instrument having a linear movement with relation to each other and bearing contacts, of resistance-conductors parallel with the path of movement of said contacts, connected in pairs by the same, and connected in alternate pairs to an electric circuit which is to be measurably varied, substantially as and for the purposes set forth.

JOHN RAPIEFF.

Witnesses:
C. W. FORBES,
H. F. PARKER.